No. 787,600. Patented April 18, 1905.

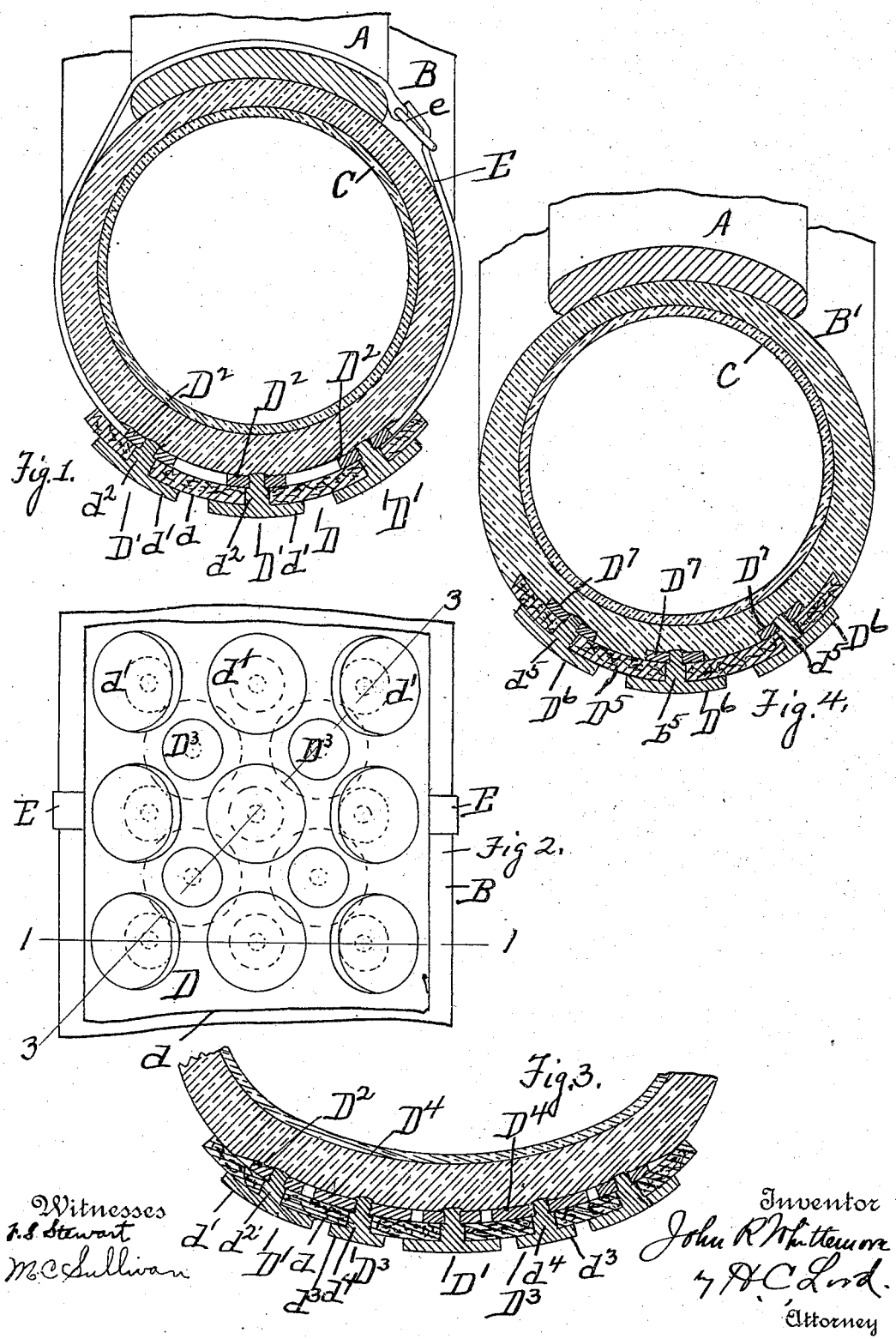

UNITED STATES PATENT OFFICE.

JOHN R. WHITTEMORE, OF ERIE, PENNSYLVANIA.

TIRE-TREAD.

SPECIFICATION forming part of Letters Patent No. 787,600, dated April 18, 1905.

Application filed January 20, 1905. Serial No. 242,019.

*To all whom it may concern:*

Be it known that I, JOHN R. WHITTEMORE, a citizen of the United States, residing at Erie, in the county of Erie and State of Pennsylvania, have invented new and useful Improvements in Tire-Treads, of which the following is a specification.

This invention relates to tire-treads; and it consists in certain improvements in the construction thereof, as will be hereinafter fully described, and pointed out in the claims.

The purpose of the invention is to provide a tire-tread with a protecting-armor to protect the tire against puncture, which will at the same time preserve the flexibility of the tire, to provide a wearing-surface for the tire at the tread, and to provide means to prevent skidding as well as details of construction for effecting this result, which will appear from the specification and claims.

The invention is illustrated in the accompanying drawings, as follows:

Figure 1 shows a section on the line 1 1 in Fig. 2; Fig. 2, an elevation of a fragment of a tire having the protective armor thereon; Fig. 3, a section on the line 3 3 in Fig. 2; Fig. 4, a cross-section of an alternative construction.

A marks the rim of the wheel, on which is arranged a pneumatic tire B, the tire being provided with the usual tube C. Secured to the outer surface of the tire is a tread D. This may be secured by any desirable means. As shown, it is secured by the straps E, which are provided with the buckles $e$, the strap being placed around the rim and secured with the buckle. The tread has the flexible body portion $d$. Rivets D', having the enlarged heads $d'$ fixed on the shank $d^2$, are passed through this flexible body and secured by the small removable heads $D^2$ within the flexible body, the heads $D^2$ being secured on the shanks by riveting. Arranged alternately with the rivets D' are a series of rivets $D^3$, having the small heads $d^3$ and shanks $d^4$. These are provided with large removable heads $D^4$ within the flexible body of the tread. The enlarged heads $D^4$ overlap the large heads D' and the small heads $d^3$ are arranged between the enlarged heads D', so that nearly all of the area of the tread is covered either by a plate or head D' or $D^3$, and the intervening flexible body preserves the flexibility of the tire. By making the heads that are exposed to the wear and strain solid with the shank a very strong construction is formed, and it also permits of the hardening of this exposed head, leaving the part that is secured by riveting softer.

In the alternative construction shown in Fig. 4, A marks the rim; B', the tire, having the tube C. In this the flexible body $D^5$ of the tread is formed integrally with the tire, and the plates $D^6$ are provided with the integral shanks $d^5$ and removable heads $D^7$. These plates are arranged alternately large and small, as in the preferred construction.

What I claim as new is—

1. In a tire-tread, the combination of a flexible body; a series of metallic pieces secured on the outer surface of the tread, and covering less than the entire surface thereof, and forming a wearing and non-skidding armor for the tire-tread; and metallic pieces secured within the flexible body and overlapping the pieces on the outer surface.

2. In a tire-tread, the combination of a flexible body; a series of rivets having a large head on the exterior surface of the tread forming a wearing and non-skidding surface therefor; and a series of rivets with a large head within the flexible body, and overlapping the large heads on the exterior surface.

3. In a tire-tread, the combination of a flexible body having means for attaching the same to a tire; a series of metallic pieces secured on the outer surface of the tread and covering less than the entire surface thereof, and forming a wearing and non-skidding armor for the tire-tread; and metallic pieces secured within the flexible body and overlapping the pieces on the outer surface.

4. In a tire-tread, the combination of a flexible body; a series of rivets having enlarged heads formed integrally with the shanks of the rivets, the heads being arranged on the outer surface of the treads, and forming a wearing and non-skidding surface therefor; the removable heads of smaller dimensions arranged within the body of the tread and secured to the shanks of the rivets, having the enlarged heads on the outer surface; a series of rivets having enlarged heads within the flexible body overlapping the enlarged heads on the exterior surface, said heads being secured to the shank of the rivet and smaller heads on the exterior surface of the tread formed integrally with the shanks of the rivets to which the enlarged interior heads are secured.

In testimony whereof I have hereunto set my hand in the presence of two subscribing witnesses.

JOHN R. WHITTEMORE.

Witnesses:
 F. S. STEWART,
 M. C. SULLIVAN.